(12) United States Patent
Mao et al.

(10) Patent No.: US 6,617,075 B2
(45) Date of Patent: Sep. 9, 2003

(54) LITHIUM-ION BATTERY

(75) Inventors: Zhenhua Mao, Ponca City, OK (US); Anaba Anani, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/727,730

(22) Filed: Dec. 1, 2000

(65) Prior Publication Data

US 2002/0068218 A1 Jun. 6, 2002

(51) Int. Cl.⁷ .......................... H01M 10/04; H01M 4/52
(52) U.S. Cl. ................. 429/231.95; 429/322; 429/223
(58) Field of Search .......................... 429/218.2, 223, 429/231.1, 231.8, 322, 60, 231.95

(56) References Cited

U.S. PATENT DOCUMENTS

| | | | | |
|---|---|---|---|---|
| 5,681,357 A | * | 10/1997 | Eschbach et al. | 29/623.4 |
| 5,744,264 A | * | 4/1998 | Barker | 429/223 |
| 5,856,043 A | * | 1/1999 | Ohsaki et al. | 429/221 |
| 6,024,773 A | * | 2/2000 | Inuzuka et al. | 29/623.4 |
| 6,046,268 A | * | 4/2000 | Ochoa et al. | 429/231.4 |
| 6,099,990 A | * | 8/2000 | Denton et al. | 423/447.5 |

\* cited by examiner

*Primary Examiner*—Patrick Ryan
*Assistant Examiner*—Gregg Cantelmo
(74) *Attorney, Agent, or Firm*—Philip H. Burrus, IV

(57) ABSTRACT

An improved lithium-ion or lithium-polymer battery that is capacity-fade resistant. The battery includes an anode comprised of graphite where density of the graphite is in a range from 1.2 to 1.5 g/c3; and the battery further has a cathode that is comprised of LiNiO2 present at a density in a range from 3.0 to 3.3 g/c3. The battery also includes an electrolyte and a separator between the anode and cathode, and the separator is coated with PVDF such that the anode, cathode, and separator are held together to form the electricity-producing battery. The ratio by weight of LiNiO2 to graphite present in the battery is preferably no greater than 2.0 to 1.

7 Claims, 1 Drawing Sheet

LITHIUM-ION BATTERY

TECHNICAL FIELD

This invention relates generally to electricity-producing batteries and their construction. More particularly, this invention relates to electrode and electrolyte compositions for lithium-ion and lithium polymer batteries that improve capacity-fade resistance characteristics of the battery.

BACKGROUND

The need for higher energy and power is becoming increasingly valuable in most portable applications as manufacturers continue to incorporate more features in their products. End users continue to also demand longer operation times as well as longer life. These demands and features place a very strong requirement on the storage energy and cycle life characteristics of the associated energy source.

Lithium-based battery cells are an attractive energy source for portable applications, due in part to their ability to provide relatively high energies and long cycle life. Lithium is the lightest of all the metals, with a high electrochemical potential, thus providing high energy densities. Rechargeable batteries using lithium as the electrochemical material are capable of providing higher energy to weight ratios than those using other chemistries.

The voltage of these cells, which corresponds to the total energy capacity, depends on the choice of the anode and cathode couples used in the cell. High voltage cathode materials include, among, others, $LixMnOy$, $LixCoOy$, and $LixNiOy$. Of these, the nickel based material, particularly $LiNiO_2$, has the highest capacity, and as a result has become a focus area for the enhancement of lithium cell energy. While cells incorporating this material yield higher energy, assessing all the energy leads to material instability that in turn results in poor cycle life characteristics of the cells. There is therefore the need to provide $LiNiO_2$ based lithium cells with high energy (capacity and voltage) and better cycle life characteristics.

Several variations of the lithium cell design exist today, one of which is the lithium-ion polymer construction. Lithium polymer battery cells are conventionally and broadly described as "rechargeable battery cells that are constructed with either a solid or 'gelled' electrolyte". The lithium polymer battery offers some design advantages, including reduced thickness, over conventional (non polymer) designs. Also, in the case where the electrolyte is completely solid, it can be argued that the cells could avoid the deleterious effects of high flammability due to the presence of liquid electrolyte in non-solid systems.

One type of a Li-polymer battery is a polyvinylidene fluoride (PVDF) gel electrolyte cell. The PVDF is placed on a separator between the electrodes, and then the battery is subjected to a specified temperature such that the PVDF forms a gel with liquid electrolyte. The gelled PVDF serves as a "glue" to hold all the components of the battery together. Even though the Li-polymer battery with a PVDF gel electrolyte has a manufacturing advantage when compared to other polymer designs, the battery suffers from rapid capacity-fade when $LiNiO_2$ is used as the cathode material. In other words, after repeated charges and discharges, the overall capacity of the Li-polymer battery to hold an adequate charge fades. This quality is disadvantageous in a battery because the battery will very quickly cease to provide a functional charge to a host device, such as a cellular telephone.

Accordingly, the existing Li-ion and Li-polymer batteries and electric cells that have a greater ease of manufacture suffer from a rapid capacity fade in the storable charge load. There is thus a need for an improved electrolyte composition.

DETAILED DESCRIPTION OF THE INVENTION

Figure 1:
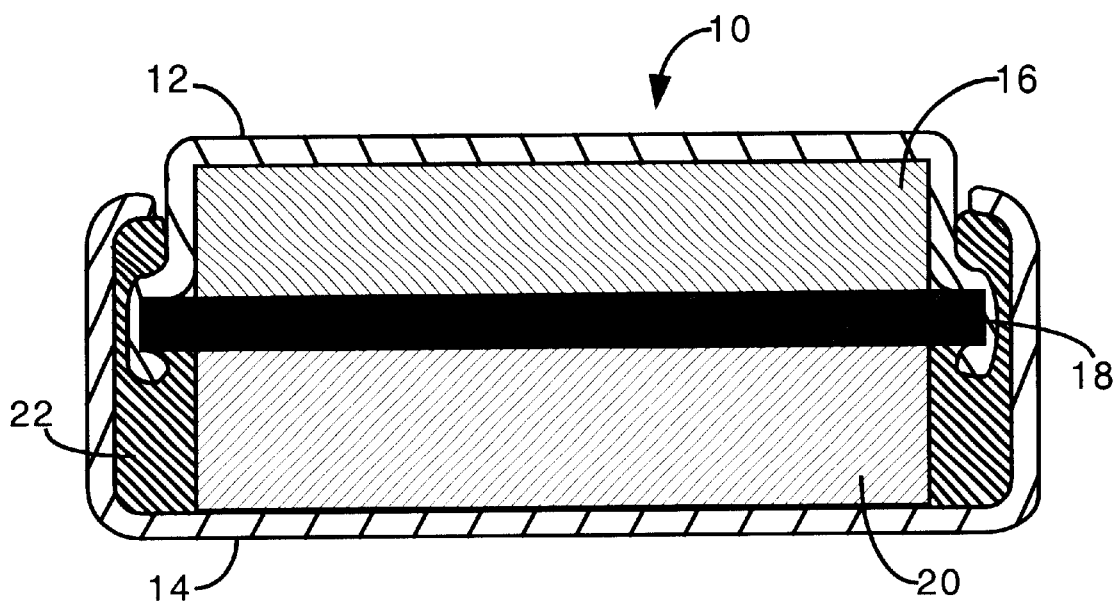
FIG. 1 is a cross section of a lithium-polymer battery with the electrodes in a coin-on-coin configuration.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

FIG. 1 illustrates a coin-on-coin type lithium-polymer battery 10 having an upper component 12 and a lower component 14, which are constructed of a conductive material. However, the battery 10 can be constructed in any Li-ion configuration as is known in the art. Within the upper component 12 is an anode 16, and within lower component 14 is a cathode 20, with separator 18 between anode 16 and cathode 20. The insulator 22 insures that the anode 16 is only in conductive connection with the upper component 12, and the cathode 20 is in conductive connection with the lower component 14 whereby conductive contact with both the upper component 12 and lower component 14 will close a circuit and allow current to flow due to the electrochemical reaction of the anode 16 and cathode 20. The coin-on-coin Li-ion battery configuration and other electrode and component configurations are well known in the art and the present inventive battery can be readily configured to any type of Li-polymer battery as would be apparent to one of skill in the art.

The Li-polymer battery 10 is capacity-fade resistant because of the particular composition of the components and the unique method of operation. In this embodiment of the invention, the anode 16 is carbon based, and has a density in a range from 1.2 to 1.5 g/cc with a density of 1.4 g/cc preferred. The carbon based anode could be a mixture preferably consisting of flake-like graphite, e.g. TIMREX™ graphite type SFG-15 or SFG-44, and Mesocarbon Microbead™ (MCMB), e.g. MCMB-6-28, MCMB-10-28, and MCMB-25-28. The anode 16 is preferably comprised of a flake-like graphite present in a range of 30–70% by weight, a spherical MCMB present in a range from 30–70% by weight, and a binder such as PVDF present in a range of 4–15% by weight. Most preferably the anode 16 is comprised of SFG-44 at 45% by weight, MCMB-25-24 at 46% by weight, and PVDF at 8% by weight.

The cathode 20 is comprised of $LiNiO_2$, and has a density in a range form 3.0 to 33 $g/c^3$ with a density of 3.1 g/cc preferred. The cathode 20 is comprised of $LiNiO_2$ present in a range of 89–93% by weight, carbon black present at 0.5–3% by weight, a flake-like graphire (such as SFG-15 or SFG-44) present at 2–5% by: weight, and a binder such as PVDF present in a range of 2–6% by weight. Most preferably, the cathode 20 is comprised of $LiNiO_2$ at 91% by weight, carbon black at 1% by weight, a flake-like graphite at 4% by weight, and PVDF at 4% by weight.

The preferred ratio by weight of $LiNiO_2$ in the active cathode to carbon in the active anode present in the battery is no greater than 2.0 to 1. The ratio by weight of LiNiO$_2$ to carbon present is more preferably in a range of 1.7–1.8 to 1. The battery also includes an electrolyte to foster current between the electrodes. One preferred electrolyte is 1 M LiPF$_6$ in either 40:30:30 (EC:DEC:DMC) or in 60:40 (EC:DMC).

The separator 18 between the anode 16 and cathode 20 is coated with PVDF such that the anode 16. cathode 20, and separator 18 are held together when the electrolyte and PVDF is gelled by temperature curing, as is known in the art.

The operation voltage window of the battery using the above component; is in a range of 2.5 to 4.1 volts. Furthermore, a Li-polymer battery constructed with above design has a charging cycle-life of over 300 cycles. This represents a significant improvement over existing Li-polymer batteries incorporating LiNiO$_2$ as the active cathode material under C rate discharge, i.e. standard load conditions.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

What is claimed is:

1. A lithium-ion battery, the battery comprising:

an anode comprised of at least carbon and has a density being in a range from 1.2 to 1.5 g/cm$^3$, wherein the anode comprises a microbead graphite present in a range from 30–70% by weight, and a first amount of flake-shaped graphite present in a range from 30–70% by weight;

a cathode comprised of LiNiO$_2$, the cathode density being in a range from 3.0 to 3.3 g/cm$^3$, wherein the cathode is comprised of LiNiO$_2$ present in a range of 89–93% by weight, carbon black present at 0.5–3% by weight, a second amount of flake-shaped graphite present at 2–5% by weight, and PVDF present in a range of 2–6% by weight;

an electrolyte; and a separator between the anode and cathode, the separator coated with PVDF such that the anode, cathode, and separator are held together, wherein the ratio by weight of active LiNiO$_2$ to active carbon present in the battery cathode and anode respectively is no greater than 2.0 to 1.

2. The battery of claim 1, wherein the lithium-ion battery is a lithium-polymer battery.

3. The battery in claim 1, wherein the operating voltage window is between 2.5V to 4.1V.

4. The battery of claim 1, wherein:

the anode is comprised of the first amount of flake-shaped graphite at 46% by weight, microbead graphite at 46% by weight, and PVDF a 8% by weight; and the cathode is comprised of LiNiO$_2$ at 91% by weight, carbon black at 1% by weight, the second amount of flake-shaped graphite at 4% by weight, and PVDF at 4% by weight.

5. The battery of claim 1, wherein:

the anode has a density of 1.4 g/cm$^3$; and the cathode has a density of 3.1 g/cm$^3$; and an active mass ratio of cathode-to-anode is 1.7–1.8 to 1.0.

6. The battery of claim 1, wherein the electrolyte is 1M LiPF$_6$ in 40:30:30 EC:DEC:DMC.

7. A lithium-ion battery, the battery comprising:

an anode;

a cathode;

an electrolyte; and a separator between the anode and cathode, the separator coated with PVDF such that the anode, cathode, and separator are held together;

wherein the anode is comprised of a first amount of graphite present in a range of 30–70% by weight, and PVDF present in a range of 4–15% by weight;

further wherein the first amount of graphite comprises microbead graphite present in a range from 30–70% by weight, and a first amount of flake-shaped graphite present in a range from 30–70% by weight; and wherein the cathode is comprised of LiNiO$_2$ present in a range of 89–93% by weight, carbon black present at 0.5–3% by weight, a second amount of flake-shaped graphite present at 2–5% by weight, and PVDF present in a range of 2–6% by weight.

* * * * *